United States Patent
Blair, II et al.

(10) Patent No.: US 10,592,798 B2
(45) Date of Patent: Mar. 17, 2020

(54) SYSTEMS AND METHODS FOR MONITORING VIA RFID TAG NON-PERMANENT INK MARKERS IN A RETAIL FACILITY

(71) Applicant: Walmart Apollo, LLC, Bentonville, AR (US)

(72) Inventors: Richard M. Blair, II, Bentonville, AR (US); Steven J. Lewis, Bentonville, AR (US); Anthony G. Wind, III, Gravette, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/053,619

(22) Filed: Aug. 2, 2018

(65) Prior Publication Data
US 2019/0042906 A1 Feb. 7, 2019

Related U.S. Application Data

(60) Provisional application No. 62/540,637, filed on Aug. 3, 2017.

(51) Int. Cl.
*G08B 1/08* (2006.01)
*G06K 19/077* (2006.01)
(Continued)

(52) U.S. Cl.
CPC ... *G06K 19/07775* (2013.01); *G06K 19/0723* (2013.01); *G06K 19/07786* (2013.01);
(Continued)

(58) Field of Classification Search
CPC ......... G06K 19/07775; G06K 19/0723; G06K 19/07786; H04W 4/33; H04W 4/029;
(Continued)

(56) References Cited

U.S. PATENT DOCUMENTS 7,164,354 B1 * 1/2007 Panzer ............... G07C 9/00111
235/384
7,327,251 B2 2/2008 Corbett, Jr.
(Continued)

FOREIGN PATENT DOCUMENTS

CN 103489290 1/2014

OTHER PUBLICATIONS

"The Final Mark"; The Final Mark End Times Truth; http://endtimestruth.com/markofthebeast/finalmark/; printed Dec. 23, 2016; pp. 1-12.
(Continued)

*Primary Examiner* — Zhen Y Wu
(74) *Attorney, Agent, or Firm* — Fitch, Even, Tabin & Flannery LLP

(57) ABSTRACT

In some embodiments, apparatuses and methods are provided herein useful to monitoring a dependent of a customer within a retail facility. In some embodiments, such a system comprises a non-permanent ink marker, wherein the non-permanent ink marker includes componentry for an RFID tag, and wherein the non-permanent ink marker is configured to be adhered to the dependent, one or more RFID readers configured to transmit and receive signals to and from the RFID tag, and a control circuit, configured to receive, from a mobile device of the customer, registration information, associate, with the mobile device of the customer based on the registration information, the RFID tag, receive, from at least one of the RFID readers, a signal from the RFID tag, determine, based on the signal received from the RFID tag, that an event has occurred, and transmit, an alert to the mobile device.

20 Claims, 3 Drawing Sheets

(51) Int. Cl.

| | | |
|---|---|---|
| *H04W 4/33* | (2018.01) | |
| *G06K 19/07* | (2006.01) | |
| *G06Q 20/32* | (2012.01) | |
| *G08B 21/02* | (2006.01) | |
| *H04W 4/029* | (2018.01) | |
| *H04W 4/80* | (2018.01) | |

(52) U.S. Cl.
CPC ..... *G06Q 20/3224* (2013.01); *G06Q 20/3278* (2013.01); *G08B 21/0272* (2013.01); *H04W 4/029* (2018.02); *H04W 4/33* (2018.02); *H04W 4/80* (2018.02)

(58) Field of Classification Search
CPC . H04W 4/80; G06Q 20/3224; G06Q 20/3278; G08B 21/0272
USPC .................................................. 340/539.13
See application file for complete search history.

(56) References Cited

U.S. PATENT DOCUMENTS

| | | | |
|---|---|---|---|
| 7,466,986 B2 | 12/2008 | Halcrow | |
| 7,768,394 B2 | 8/2010 | Amidi | |
| 8,145,239 B2 | 3/2012 | Savoor | |
| 8,237,551 B2 | 8/2012 | Sweeney | |
| 8,600,409 B2 | 12/2013 | Li | |
| 8,706,815 B2 | 4/2014 | Redmond | |
| 8,884,817 B2 | 11/2014 | Seymour | |
| 8,897,803 B2 | 11/2014 | Pylappan | |
| 9,270,834 B2 | 2/2016 | Chen | |
| 9,396,640 B2 | 7/2016 | Fishwick | |
| 9,730,015 B1 | 8/2017 | Lee | |
| 9,734,373 B1* | 8/2017 | Heath | G06K 9/00362 |
| 2004/0267283 A1 | 12/2004 | Mavor | |
| 2005/0051109 A1* | 3/2005 | Fantin | A01K 11/003 |
| | | | 119/721 |
| 2005/0061890 A1 | 3/2005 | Hinckley | |
| 2005/0073419 A1 | 4/2005 | Gary | |
| 2007/0040693 A1* | 2/2007 | Medve | G07C 9/00111 |
| | | | 340/573.1 |
| 2008/0096545 A1 | 4/2008 | Delean | |
| 2008/0192666 A1 | 8/2008 | Koskan | |
| 2008/0248813 A1 | 10/2008 | Chatterjee | |
| 2009/0076346 A1 | 3/2009 | James | |
| 2009/0273439 A1 | 11/2009 | Selsor | |
| 2011/0134840 A1 | 6/2011 | Kim | |
| 2011/0225264 A1* | 9/2011 | Serar | G06F 21/42 |
| | | | 709/217 |
| 2011/0285506 A1* | 11/2011 | Hillis | G08B 21/0238 |
| | | | 340/8.1 |
| 2012/0223834 A1 | 9/2012 | Hyatt | |
| 2013/0296747 A1 | 11/2013 | Perreault | |
| 2015/0035672 A1 | 2/2015 | Housley | |
| 2015/0142980 A1 | 5/2015 | Bragg | |
| 2015/0356603 A1* | 12/2015 | Tung | G06Q 30/0255 |
| | | | 705/14.55 |
| 2016/0063836 A1* | 3/2016 | Fishwick | G08B 21/0272 |
| | | | 340/8.1 |
| 2016/0104062 A1 | 4/2016 | Costantino | |
| 2016/0139273 A1* | 5/2016 | Sobol | G01S 19/16 |
| | | | 342/357.52 |
| 2016/0330258 A1* | 11/2016 | Sandhu | H04L 67/16 |
| 2017/0092090 A1* | 3/2017 | Lerner | G06K 7/10366 |
| 2017/0111271 A1 | 4/2017 | Thubert | |
| 2017/0186110 A1* | 6/2017 | Carpenter | G06Q 20/045 |
| 2017/0325065 A1* | 11/2017 | Azam | H04W 4/029 |
| 2018/0032768 A1* | 2/2018 | Ganesan | G06K 19/0709 |
| 2018/0288040 A1* | 10/2018 | Kursun | H04L 63/0861 |
| 2019/0053465 A1* | 2/2019 | Knight | A01K 1/0613 |

OTHER PUBLICATIONS

Jones, K. C.; "Invisible RFID Ink Safe For Cattle And People, Company Says"; Information Week; https://www.informationweek.com/invisible-rfid-ink-safe-for-cattle-and-people-company-says/d/d-id/1050602; published Jan. 10, 2007; pp. 1-13.

PCT; App. No. PCT/US2018/044543; International Search Report and Written Opinion dated Oct. 17, 2018.

Tribe, J. et al.; "Tattoo Antenna Temporary Transfers Operating On-Skin (TATTOOS)"; University of Kent; https://kar.kent.ac.uk/50330/1/Tribe_TattooAntennaTemporaryTransfersOperatingOnSkin15.pdf; published in 2015; pp. 1-12.

Ziai, M. et al.; "Temporary On-Skin Passive UHF RFID Transfer Tag"; IEEE Transactions on 1, 11 Antennas and Propagation; vol. 59, Issue: 10, Oct. 2011; http://ieeexplore.ieee.org/xpl/articleDetails.jsp?tp=&arnumber=5978203&queryText%3DTemporary+On-skin+Passive+UHF+RFID+ Transfer+ Tag+Design; Published Aug. 8, 2011; pp. 1-9.

PCT; App. No. PCT/US2018/066668; International Search Report and Written Opinion dated Mar. 1, 2019.

USPTO; U.S. Appl. No. 16/229,729; Office Action dated Aug. 6, 2019; (pp. 1-31).

* cited by examiner

SYSTEMS AND METHODS FOR MONITORING VIA RFID TAG NON-PERMANENT INK MARKERS IN A RETAIL FACILITY

CROSS-REFERENCE TO RELATED APPLICATION

This application claims the benefit of U.S. Provisional Application No. 62/540,637, filed Aug. 3, 2017, which is incorporated by reference in its entirety herein.

TECHNICAL FIELD

This invention relates generally to radio frequency identification (RFID) technology and, more particularly, to non-permanent ink markers including RFID tags.

BACKGROUND

Some retail facilities are quite large. Because of the size of retail facilities and the propensity for dependents (e.g., children, elderly persons, etc.) to wander, customers (e.g., parents, caregivers, etc.) can lose their dependents within the retail facility. Not only is it possible for a dependent to become lost within a retail facility, but someone with malicious intent may attempt to leave with the dependent. Consequently, a need exists for systems, methods, and apparatuses to monitor the location of dependents within a retail facility.

BRIEF DESCRIPTION OF THE DRAWINGS

Disclosed herein are embodiments of systems, apparatuses, and methods pertaining to monitoring a dependent within a retail facility. This description includes drawings, wherein.

Figure 1:
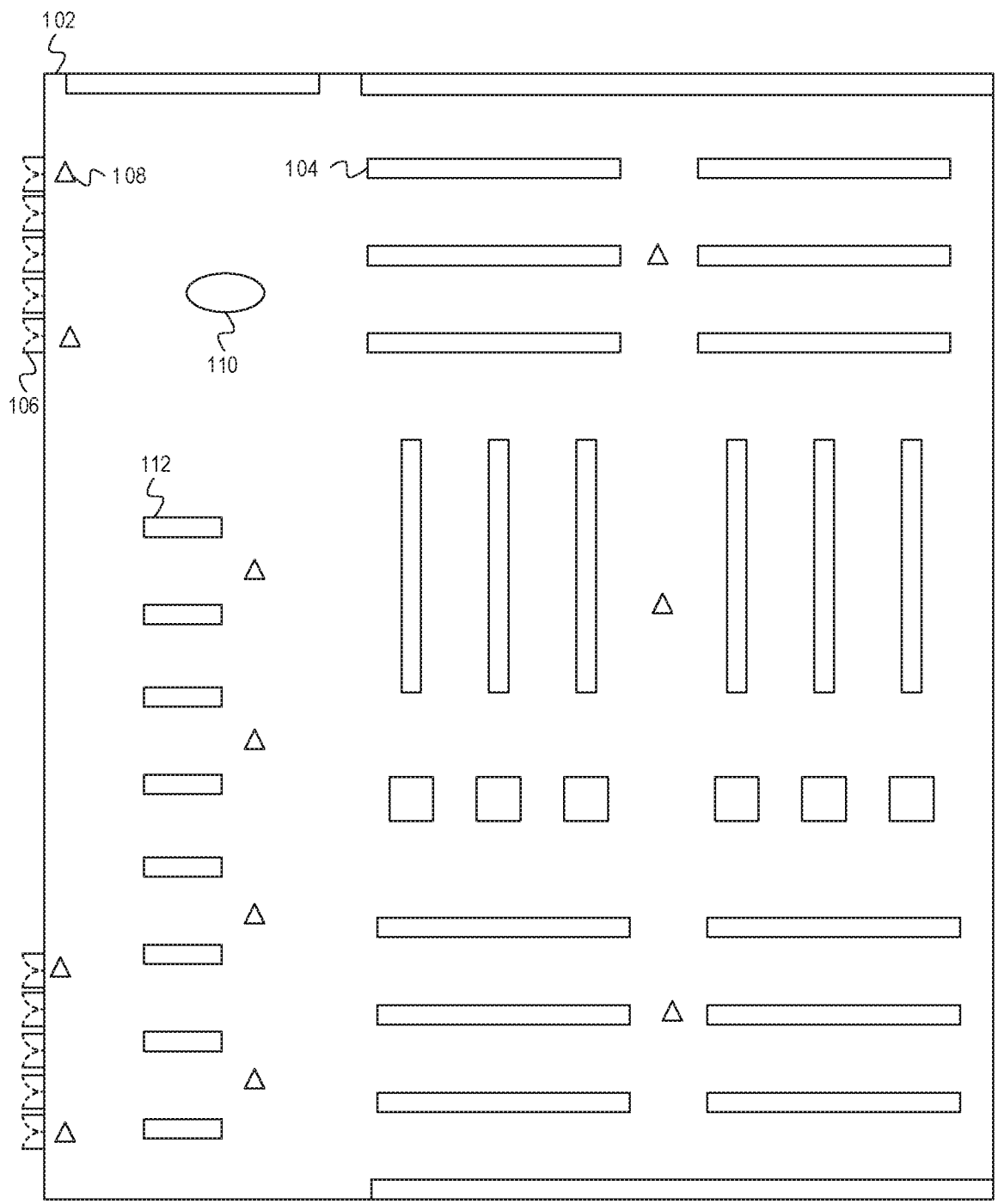
FIG. 1 depicts a retail facility 102 including multiple RFID readers 108 capable of monitoring the location of a dependent, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to monitoring a dependent of a customer within a retail facility. In some embodiments, a system for monitoring a dependent of a customer within a retail facility comprises a non-permanent ink marker, wherein the non-permanent ink marker includes componentry for an RFID tag, and wherein the non-permanent ink marker is configured to be adhered to the dependent, one or more RFID readers configured to transmit and receive signals to and from the RFID tag, wherein the one or more RFID readers are located within the retail facility, and a control circuit, wherein the control circuit is communicatively coupled to the one or more RFID readers and configured to receive, from a mobile device of the customer, registration information, wherein the registration information identifies the dependent, the mobile device, and the customer, associate, with the mobile device of the customer based on the registration information, the RFID tag, receive, from at least one of the one or more RFID readers, a signal from the RFID tag after being adhered to the dependent, determine, based on the signal received from the RFID tag, that an event has occurred, and transmit, via a wide area wireless network (WWAN) based on the occurrence of the event, an alert to the mobile device.

As previously discussed, dependents can become lost while shopping with customers in a retail facility. As one example, a parent can lose his or her child with shopping in the retail facility. The child may wander off from the parent, the child may be shopping on his or her own and the parent can't locate his or her child, or an unauthorized person may try to leave with the child. In any case, the parent and child would benefit from a system that allows the parent to quickly locate his or her child as well as alert the parent if his or her child attempts to leave the retail facility. Disclosed herein are systems, methods, and apparatuses that allow a customer to locate his or her dependents. Additionally, in some embodiments, the systems, methods, and apparatuses can alert the customer upon the occurrence of an event. The event can be the dependent leaving the retail facility, the dependent entering a certain area of the retail facility, the dependent purchasing an item, or any other suitable event.

In some embodiments, a system includes non-permanent ink markers (e.g., temporary tattoos) that include componentry for an RFID tag and are configured to be adhered to the dependent. A customer can associate his or her mobile device with the non-permanent ink marker. The retail facility includes RFID readers that can track the non-permanent ink marker and alert the customer upon the occurrence of an event. For example, if the dependent leaves the retail facility (or goes near an exit), the system can alert the customer. The discussion of FIG. 1 provides an overview of such a system.

FIG. 1 depicts a retail facility 102 including multiple RFID readers 108 capable of monitoring the location of a dependent, according to some embodiments. The retail facility includes multiple product display units 104 (e.g., shelves, racks, end caps, etc.), point-of-sale (POS) terminals 112, and doors 106 (e.g., exits). The RFID readers 108 can be placed strategically so that a non-permanent ink marker 110 including componentry for an RFID tag can be monitored throughout the retail facility 102. The componentry for the RFID tag can include an RFID chip and/or an RFID antenna. The RFID readers 108 can transmit to, and receive signals from, the non-permanent ink marker 110 via the componentry for the RFID tag. In some embodiments, the RFID readers 108 are located near the POS terminals 112 and the doors 106, as well as in various locations throughout the retail facility 102.

In some embodiments, in order to alert the customer of the occurrence of an event related to the non-permanent ink marker 110, the system allows the customer to associate the non-permanent ink marker 110 with him or herself. For example, the customer can associate the non-permanent ink marker 110 with his or her mobile device (e.g., smartphone). Alternatively, or additionally, the customer can associate the non-permanent ink marker 110 with the his or her account (e.g., a store account, social media account, shopping account, etc.). In such embodiments, the account may already include contact information for the customer. In either case, the customer can associate the non-permanent ink marker 110 with him or herself at the retail facility 102 (e.g., at a kiosk at the retail facility 102) and/or before the customer arrives at the retail facility 102. In either case, the customer can provide registration information to the system at the kiosk and/or via his or her mobile device and associate the non-permanent ink marker 110 with him or herself. The registration information can identify the dependent, the mobile device, and the customer. If the system is account-based and the customer already has an account, the system may already have the registration information. In such embodiments, the customer can simply login to his or her account to inform the system that he or she is heading to the retail facility and/or that he or she has arrived at the retail facility. In some embodiments, the RFID componentry of the non-permanent ink marker 110 can include a unique identifier. In such embodiments, the system associates the customer with the non-permanent ink marker 110 via the unique identifier.

After associating the non-permanent ink marker 110 with the customer, the RFID readers 108 monitor the non-permanent ink marker 110 as the dependent travels throughout the retail facility. The system monitors the non-permanent ink marker 110 for the occurrence of an event. An event can be any suitable occurrence. For example, an event can occur if the dependent enters a specified area of the retail facility 102 (e.g., a sporting good department, an area near the POS terminals 112, an area near the doors 106, an area outside the retail facility 102, etc.). In some embodiments, the system also monitors a location of the customer. For example, the system can determine the location of the customer based on the customer's mobile device (e.g., via RFID signals, GPS signals, a WWAN signal, etc.). In such embodiments, the events can be based not only on the location of the non-permanent ink marker 110, but also upon the location of the customer. For example, an event may occur when the dependent enters an area near, or passes through, the doors 106 without being accompanied by the customer.

Upon occurrence of an event, the system transmits an alert to the customer. For example, the system can transmit an alert to the customer's mobile device via a network, such as a wireless wide area network (WWAN). The alert can be a short message service (SMS) message, a multimedia message service (MMS) message, an email, a phone call, etc. A type of the alert and the urgency of the alert can be based upon the event that has occurred. For example, if the event is that the dependent is more than a predetermined distance (e.g., fifty feet) from the customer, the alert can be an SMS message indicating that the dependent is beyond the predetermined distance from the customer. As another example, if the event is that the dependent has left through the doors 106 and the customer is still in the retail facility, the alert can be a phone call to the customer's mobile device. Additionally, the system can cause an alert to be broadcast over the retail facility 102 intercom and an alert to employees to lock down the retail facility 102.

In some embodiments, the customer may be able to query the system to determine a location of his or her dependent. In such embodiments, the system can respond by transmitting an indication of the non-permanent ink marker's 110 location. Additionally, or alternatively, the system can cause the customer's mobile device to present a map of the retail facility 102 with an indication of the non-permanent ink marker's 110 location.

In addition to events being based on locations of the non-permanent ink marker 110 and/or the customer, in some embodiments, events are based on activities of the dependent. For example, a payment account (e.g., a store account, a credit card account, a gift card account, etc.) can be associated with the non-permanent ink marker 110. In such embodiments, the dependent may be able to make purchases via the non-permanent ink marker 110. For example, the dependent can check out at one of the POS terminals 112 using the RFID componentry of the non-permanent ink marker 110. In such embodiments, the event can occur when the dependent purchases, or attempts to purchase, an item. Additionally, or alternatively, the event can occur when the dependent purchases, or attempts to purchase, a certain type of item, an item above a certain value, or a total transaction above a certain value. For example, if the dependent is restricted (based on account preferences) from purchasing an R-rated movie, the event can occur, and the customer alerted, if the dependent attempts to purchase an R-rated movie.

In some embodiments, the customer can enter preferences before or during association of the non-permanent ink marker 110 with him or herself. If the system is account-based, the customer can enter preferences that persistent between associations. The preferences can relate to alert preferences, event preferences, type or design preferences of non-permanent ink markers, payment account preferences, etc. The preferences can be included in the registration information. Additionally, the preferences can specify a timeframe for which the monitoring will occur. For example, for privacy reasons, the customer can set the association to expire after a predetermined period of time (e.g., two hours) or upon the occurrence of an event (e.g., the customer completing a transaction at the retail facility or leaving the retail facility).

Figure 2:
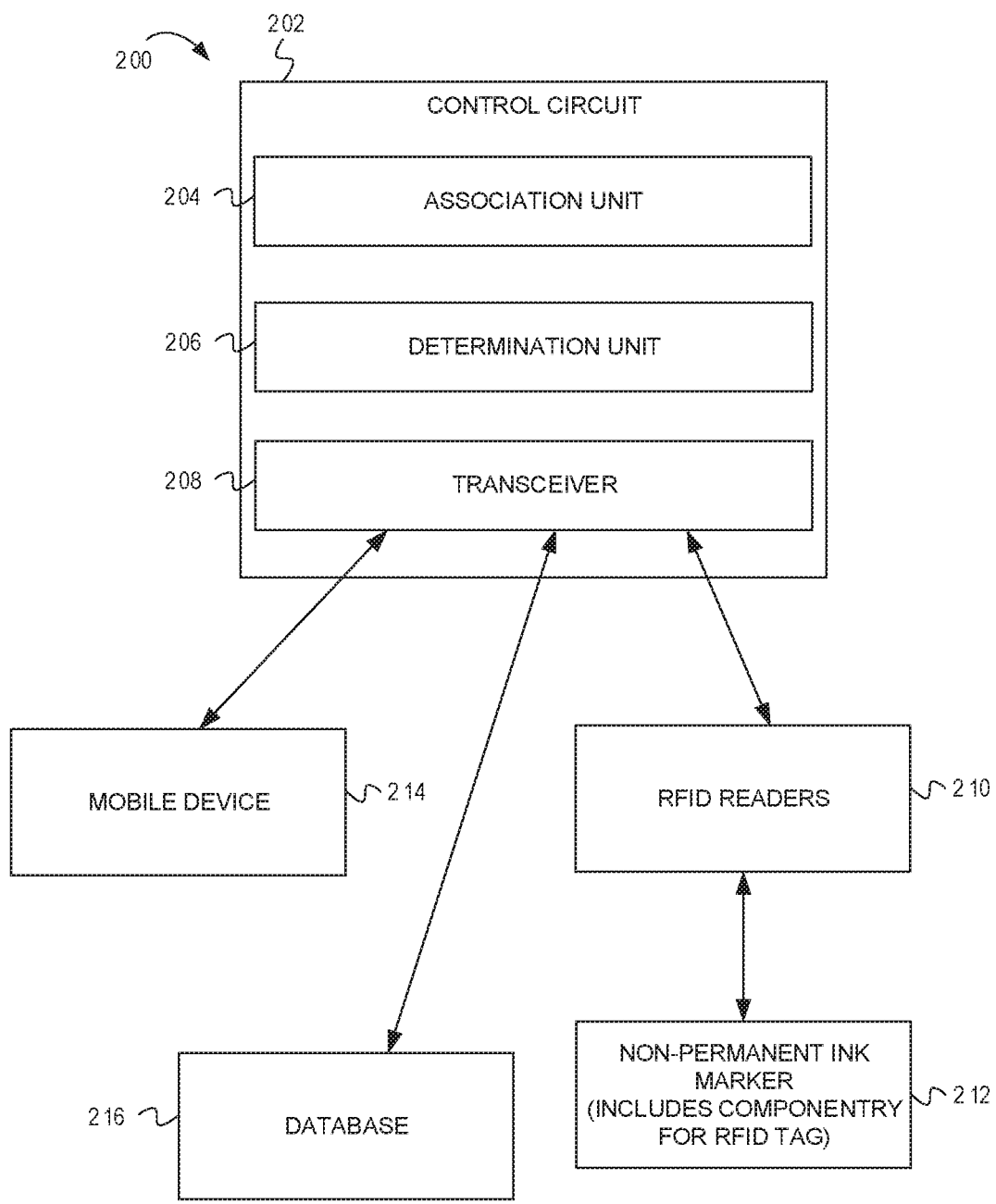
FIG. 2 is a block diagram of a system 200 for monitoring the location of a dependent in a retail facility, according to some embodiments.

While the discussion of FIG. 1 provides overview information of a system for monitoring the location of a dependent in a retail facility, the discussion of FIG. 2 provides additional information regarding such a system.

FIG. 2 is a block diagram of a system 200 for monitoring the location of a dependent in a retail facility, according to some embodiments. The system 200 can include a control circuit 202, a mobile device 214, RFID readers 210, a non-permanent ink marker 212, and a database 216. The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The control circuit 202 can include an association unit 204, a determination unit 206, and a transceiver 208. The association unit receives registration information from the customer and associates the non-permanent ink marker 212 with the customer. For example, the association unit 204 can associate the non-permanent ink marker 212 with the customer's mobile device. In some embodiments, the association unit 204 generates a unique identifier for the non-permanent ink marker and associates the unique identifier with the customer's mobile device. The registration information can identify the dependent, the mobile device (e.g., the customer's mobile device), and the RFID tag (e.g., the unique identifier for the RFID tag). The association unit 204 can create this association in a database 216 that is specific to the retail facility, specific to a retailer, or specific to a monitoring application (e.g., a monitoring application that is compatible with the system 200 and other systems in other retail facilities or locations).

The determination unit 206 determines when an event occurs. For example, the determination unit 206 can receive information, via the transceiver 208, from the RFID readers 210. The information can include signals received from the RFID tag of the non-permanent ink marker 212 and can be used to determine a location of the RFID tag. The location of the RFID tag can be used to determine the occurrence of the event. Additionally, the information can include an indication of the customer, such as a location of the mobile device 214. In such embodiments, the location of the RFID tag and/or the location of the mobile device 214 can be used to determine the occurrence of an event.

Figure 3:
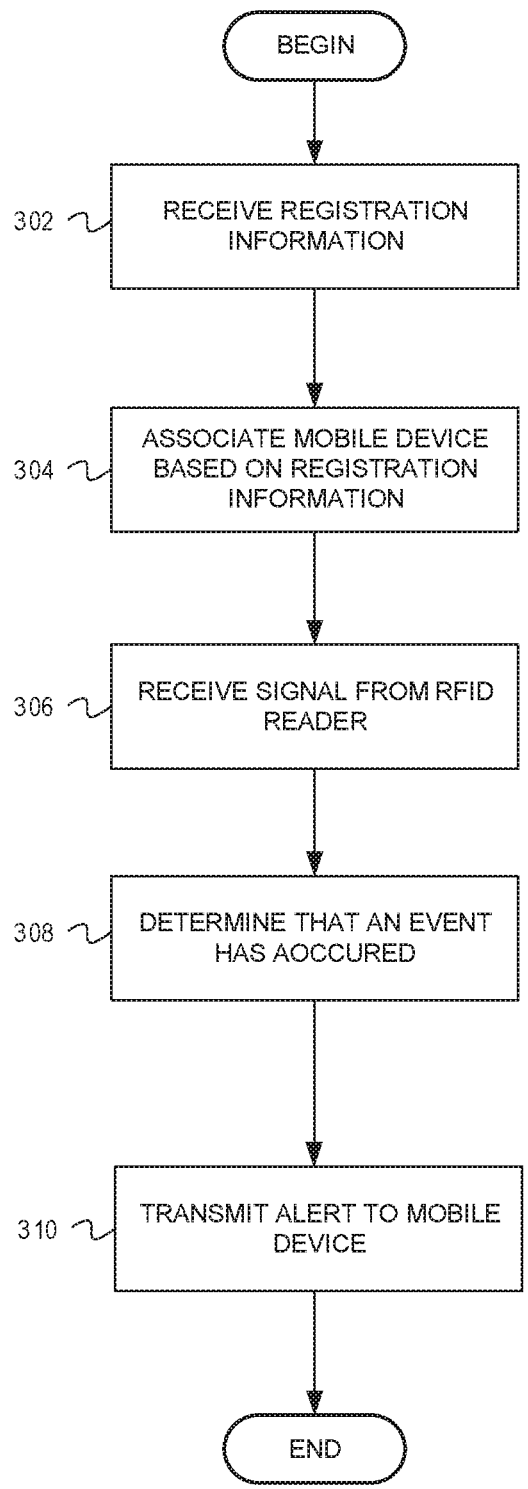
FIG. 3 is a flow chart depicting example operations for monitoring a dependent of a customer within a retail facility, according to some embodiments.

While the discussion of FIG. 2 provides additional detail regarding a system from monitoring a dependent of a customer within a retail facility, the discussion of FIG. 3 provides example operations for monitoring a dependent of a customer in a retail facility.

FIG. 3 is a flow chart depicting example operations for monitoring a dependent of a customer within a retail facility, according to some embodiments. The flow begins at block 302.

At block 302, registration information is received. For example, a control circuit can receive the information from the customer. The control circuit can receive the registration from the customer directly via, for example, the customer's mobile device. Additionally, or alternatively, in an account-based system, the control circuit can receive the information from a database including registration information. The registration information identifies the dependent, the mobile device, and an RFID tag (associated with a non-permanent ink marker). In some embodiments, the control circuit receives the registration information before the customer has arrived at the retail facility (e.g., via the customer's mobile device). Additionally, or alternatively, the control circuit can receive the registration information once the customer arrives at the retail facility (e.g., via a kiosk at the retail facility). The flow continues at block 304.

At block 304, the mobile device is associated based on the registration information. For example, the control circuit can associate the mobile device based on the registration information. The association can be stored in a local database (e.g., a database residing in the retail facility) or in a database remote from the retail facility (e.g., a database for the retailer or a group of retailers). The association can include an identifier of the mobile device and an identifier of the non-permanent ink marker. This association allows the correct customer to be alerted upon the occurrence of an event. For example, assume that $Customer_1$ is associated with Non-Permanent Ink $Marker_1$. Upon occurrence of an event related to Non-Permanent Ink $Marker_1$, the system determines that $Customer_1$ is associated with Non-Permanent Ink $Marker_1$ and transmits an alert to $Customer_1$. In some embodiments, after the registration information is received and the non-permanent ink marker is adhered to the dependent, the system can perform a test to ensure that the association has been performed properly and that the RFID readers can read the RFID tag associated with the non-permanent ink marker. The flow continues at block 306.

At block 306, a signal is received from an RFID reader. For example, the control circuit can receive the signal from the RFID reader. The RFID readers are located throughout the retail facility and monitor RFID tags within the retail facility. While the non-permanent ink marker is in, or near, the retail facility, the RFID readers monitor the non-permanent ink marker. For example, the RFID readers can monitor the location of the non-permanent ink marker within, and in some embodiments near, the retail facility. In some embodiments, the RFID readers (or the system generally) can monitor the location of the customer, for example, based on a location of the customer's mobile device. The signal received from the RFID reader can indicate the location of the non-permanent ink marker and/or the location of the customer. Additionally, the control circuit can receive transaction information associated with the non-permanent ink marker and/or the customer from the RFID readers and/or other components of the system (e.g., POS terminals). The flow continues at block 308.

At block 308, it is determined that an event has occurred. For example, the control circuit can determine that the event has occurred. The event can be based on the location of the non-permanent ink marker, the location of the customer, activities performed by the dependent, and/or activities performed by the customer. For example, if the event is that the dependent has entered a zone of the retail facility, the control circuit can determine that the event has occurred based on the location of the non-permanent ink marker. In one embodiment, the control circuit determines the location of the non-permanent ink marker based on which RFID reader(s) reads the componentry for the RFID tag included in the non-permanent ink marker. For example, if an RFID reader located near an entrance to a pharmacy section reads the componentry for the RFID tag included in the non-permanent ink marker, the control circuit determines that the dependent has entered the pharmacy section. In other embodiments, the determination that the event has occurred can be based on more than one parameter, such as the location of non-permanent ink marker and the location of the customer. For example, the system can determine the location of the customer based on his or her mobile device (e.g., based on a WWAN, WAN, NFC, etc. signal). The control circuit then compares the location of the non-permanent ink marker and the location of the customer. Additionally, in some embodiments, the control circuit determines if a rule exists regarding the locations (e.g., the customer has set his or her preferences to be alerted if his or her child is more than fifteen feet from him or her). The flow continues at block 310.

At block 310, an alert is transmitted to the mobile device. For example, the control circuit can cause an alert to be transmitted to the mobile device. Once the event has occurred, the system determines which mobile device is associated with the non-permanent ink marker and transmits the alert to the appropriate mobile device. The alert can be a short message service (SMS) message, a multimedia message service (MMS) message, an email, a phone call, etc. A type of the alert and the urgency of the alert can be based upon the event that has occurred. For example, if the event is that the dependent is more than a predetermined distance (e.g., fifty feet) from the customer, the alert can be an SMS message indicating that the dependent is beyond the predetermined distance from the customer. As another example, if the event is that the dependent has left through the doors and the customer is still in the retail facility, the alert can be a phone call to the customer's mobile device. Additionally, the system can cause an alert to be broadcast over the retail facility intercom and an alert to employees to lock down the retail facility.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

Generally speaking, pursuant to various embodiments, systems, apparatuses, and methods are provided herein useful to monitoring a dependent of a customer within a retail facility. In some embodiments, a system for monitoring a dependent of a customer within a retail facility comprises a non-permanent ink marker, wherein the non-permanent ink marker includes componentry for an RFID tag, and wherein the non-permanent ink marker is configured to be adhered to the dependent, one or more RFID readers configured to transmit and receive signals to and from the RFID tag, wherein the one or more RFID readers are located within the retail facility, and a control circuit, wherein the control circuit is communicatively coupled to the one or more RFID readers and configured to receive, from a mobile device of the customer, registration information, wherein the registration information identifies the dependent, the mobile device, and the customer, associate, with the mobile device of the customer based on the registration information, the RFID tag, receive, from at least one of the one or more RFID readers, a signal from the RFID tag after being adhered to the dependent, determine, based on the signal received from the RFID tag, that an event has occurred, and transmit, via a wide area wireless network (WWAN) based on the occurrence of the event, an alert to the mobile device.

In some embodiments, an apparatus, and a corresponding method performed by the apparatus, comprises receiving, from a mobile device of a customer, registration information, wherein the registration information identifies the dependent, the mobile device, and the customer, associating, with the mobile device based on the registration information, an RFID tag, wherein componentry of the RFID tag is included in a non-permanent ink marker, and wherein the non-permanent ink marker is configured to be adhered to the dependent, receiving, from an RFID reader located within the retail facility, a signal from the RFID tag after being applied to the dependent, determining, based on the signal received from the RFID tag, that an event has occurred, and transmitting, via a wireless wide area network based on the occurrence of the event, an alert to the mobile device.

What is claimed is:

1. A system for monitoring a dependent of a customer within a retail facility, the system comprising:
   a temporary tattoo, wherein the temporary tattoo includes componentry for a radio frequency identification ("RFID") tag, and wherein the temporary tattoo is configured to be adhered to the dependent;
   one or more RFID readers configured to transmit and receive signals to and from the RFID tag, wherein the one or more RFID readers are located within the retail facility; and
   a control circuit, wherein the control circuit is communicatively coupled to the one or more RFID readers and configured to:
      receive, from the customer's smartphone, registration information, wherein the registration information identifies the dependent, the customer's smartphone, and the customer;
      associate, with the customer's smartphone based on the registration information, the RFID tag;
      receive, from at least one of the one or more RFID readers, a signal from the RFID tag after the temporary tattoo has been adhered to the dependent;
      determine, based on the signal received from the RFID tag, that an event has occurred; and
      transmit, via a network based on the occurrence of the event, an alert to the customer's smartphone.

2. The system of claim 1, wherein the componentry of the RFID tag includes an RFID chip and an RFID antenna.

3. The system of claim 1, wherein the alert is one or more of a short message service (SMS) message, a multimedia message service (MMS) message, an email, and a phone call.

4. The system of claim 1, wherein the at least one RFID reader is located near an exit to the retail facility.

5. The system of claim 1, wherein the event occurs when the temporary tattoo leaves the retail facility.

6. The system of claim 1, wherein the control circuit is further configured to:
   determine a location of the customer's smartphone.

7. The system of claim 6, wherein the event occurs when the temporary tattoo leaves the retail facility and the location of the customer's smartphone is within the retail facility.

8. The system of claim 1, wherein the control circuit is further configured to:
   determine, based, at least in part, on the registration information, preferences.

9. The system of claim 8, wherein the preferences include one or more of event preferences, temporary tattoo design preferences, payment account association preferences, and alert preferences.

10. The system of claim 1, wherein the control circuit is further configured to:

associate, with the temporary tattoo, a payment account, wherein association of the temporary tattoo with the payment account allows the dependent to purchase products via the RFID tag.

11. A method for monitoring a dependent of a customer in a retail facility, the method comprising:
receiving, from the customer's smartphone, registration information, wherein the registration information identifies the dependent, the customer's smartphone, and the customer;
associating, with the customer's smartphone based on the registration information, a radio frequency identification ("RFID") tag, wherein componentry of the RFID tag is included in a temporary tattoo, and wherein the temporary tattoo is configured to be adhered to the dependent;
receiving, from an RFID reader located within the retail facility, a signal from the RFID tag after the temporary tattoo has been adhered to the dependent;
determining, based on the signal received from the RFID tag, that an event has occurred; and
transmitting, via a network based on the occurrence of the event, an alert to the customer's smartphone.

12. The method of claim 11, wherein the componentry of the RFID tag includes an RFID chip and an RFID antenna.

13. The method of claim 11, wherein the alert is one or more of a short message service (SMS) message, a multimedia message service (MMS) message, an email, and a phone call.

14. The method of claim 11, wherein the RFID reader is located near an exit to the retail facility.

15. The method of claim 11, wherein the event occurs when the temporary tattoo leaves the retail facility.

16. The method of claim 11, further comprising:
determining a location of the customer's smartphone.

17. The method of claim 16, wherein the event occurs when the temporary tattoo leaves the retail facility and the location of the customer's smartphone is within the retail facility.

18. The method of claim 11, further comprising:
determining, based, at least in part, on the registration information, preferences.

19. The method of claim 18, wherein the preferences include one or more of event preferences, temporary tattoo design preferences, payment account association preferences, and alert preferences.

20. The method of claim 11, further comprising:
associating, with the temporary tattoo, a payment account, wherein association of the temporary tattoo with the payment account allows the dependent to purchase products via the RFID tag.

* * * * *